(12) United States Patent
Feng et al.

(10) Patent No.: US 12,025,590 B2
(45) Date of Patent: Jul. 2, 2024

(54) LOADING SYSTEM AND METHOD FOR HOPKINSON COMPRESSION BAR TEST UNDER WATER-GAS-TEMPERATURE MULTI-FIELD COUPLING ACTION

(71) Applicant: Taiyuan University of Technology, Shanxi (CN)

(72) Inventors: Guorui Feng, Taiyuan (CN); Kai Wang, Taiyuan (CN); Jinwen Bai, Taiyuan (CN); Jun Guo, Taiyuan (CN); Boqiang Cui, Taiyuan (CN); Xudong Shi, Taiyuan (CN); Haotian Wu, Taiyuan (CN); Xinyu Yang, Taiyuan (CN); Cheng Song, Taiyuan (CN)

(73) Assignee: Taiyuan University of Technology, Taiyuan (CN)

( * ) Notice: Subject to any disclaimer, the term of this patent is extended or adjusted under 35 U.S.C. 154(b) by 258 days.

(21) Appl. No.: 17/835,926

(22) Filed: Jun. 8, 2022

(65) Prior Publication Data
US 2022/0390340 A1   Dec. 8, 2022

(30) Foreign Application Priority Data

Jun. 8, 2021 (CN) .......................... 202110638208.6

(51) Int. Cl.
*G01N 3/10* (2006.01)
(52) U.S. Cl.
CPC ....... *G01N 3/10* (2013.01); *G01N 2203/0019* (2013.01)

(58) Field of Classification Search
None
See application file for complete search history.

(56) References Cited

U.S. PATENT DOCUMENTS 10,580,545 B2 * 3/2020 Banine ................. G02B 5/1814
11,921,088 B2 * 3/2024 Zhou ..................... G01N 3/317
(Continued)

FOREIGN PATENT DOCUMENTS

| CN | 103454164 A | 12/2013 |
|---|---|---|
| CN | 206248439 U | 6/2017 |

(Continued)

*Primary Examiner* — Peter J Macchiarolo
*Assistant Examiner* — Jermaine L Jenkins
(74) *Attorney, Agent, or Firm* — Bochner PLLC; Andrew D. Bochner

(57) ABSTRACT

A loading system for a Hopkinson pressure bar test under water-gas-temperature multi-field coupling action includes: a sample sealed cabin which includes sealing flanges, Y-shaped and high-temperature resistant sealing rings, and a sealed cabin body; a gas pressure loading device which includes a high-pressure gas tank, a pressure regulating valve, a second barometer, a second high-pressure valve and a first three-way valve connected in sequence; a water pressure loading device which includes an electric pressure test water pump, a water pressure gauge, an accumulator and a one-way valve connected in sequence; a temperature loading device which includes thermocouple heating rods, a temperature display and a thermocouple temperature control circuit board connected in sequence; and a dynamic and static combined loading device which includes an axial pressure loading device, an impact loading device and a Hopkinson pressure bar member.

12 Claims, 4 Drawing Sheets

(56) References Cited

U.S. PATENT DOCUMENTS

2015/0123670 A1* 5/2015 Robbat, Jr. ............ G01N 27/70
                                                    324/464
2021/0325287 A1* 10/2021 Xie ......................... G01N 3/08

FOREIGN PATENT DOCUMENTS

| CN | 109406311 A | 3/2019 |
| CN | 110082228 A | 8/2019 |
| CN | 112858024 A | 5/2021 |

* cited by examiner

LOADING SYSTEM AND METHOD FOR HOPKINSON COMPRESSION BAR TEST UNDER WATER-GAS-TEMPERATURE MULTI-FIELD COUPLING ACTION

CROSS REFERENCE TO RELATED APPLICATION

This patent application claims the benefit and priority of Chinese Patent Application No. 202110638208.6 filed on Jun. 8, 2021, the disclosure of which is incorporated by reference herein in its entirety as part of the present application.

TECHNICAL FIELD

The disclosure relates to a dynamic testing device and method for coal and rock materials, in particular to a loading system and method for a Hopkinson compression bar test under water-gas-temperature multi-field coupling action, and belongs to the field of rock dynamic mechanic property testing.

BACKGROUND ART

The high-intensity exploitation of coal resources forces more and more coal mines in China to face the embarrassing situation of "elimination, closure and abandonment". Furthermore, due to the limitation of history and mining technology, a large number of scarce high-quality coal resources (hereinafter referred to as "residual coal" resources) are left in the residual mining area of the above aging mine, with a reserve of about 40 billion tons. Safe and green mining of residual coal resources in residual mining areas is of great significance to promote the sustainable development of China's coal resources and alleviate the tension situation of national energy demand. However, the complex remaining space makes the residual coal resources in the multi-phase and multi-field complex environment, such as solid-liquid-gas and stress-temperature environment. In addition, the secondary mining of residual coal resources inevitably causes strong mining disturbance and induce impact load. Therefore, accurately mastering the mechanic properties of coal and rock mass under the coupling action of water, gas, temperature and impact load is an important premise to ensure the safe mining of residual coal. At present, the existing indoor tests can only complete the dynamic impact test research on the coal and rock mass under the action of water and dynamic coupling (CN 206248439 U), of gas and dynamic coupling (CN 110082228 A) and temperature and dynamic coupling (CN201811601112.7). There is no testing device and method under the simultaneous coupling action of water, gas, temperature, dynamic load and static load, so that the dynamic mechanical response of coal and rock mass under coupling action of dynamic load, static load, water, gas and temperature cannot be understood comprehensively. Therefore, in view of the difficulties faced by this project, the research and development of the dynamic impact test device under multi-field coupling action of water, gas and temperature is the top priority.

SUMMARY

In view of the technical problems in the prior art, an object of the disclosure is to provide a loading system and method for dynamically and statically loading Hopkinson pressure bar under water-gas-temperature multi-field coupling action, which can truly simulate the occurrence environment of coal and rock mass in the residual mining area, and solve the technical problem that it is impossible to test the dynamic mechanic properties of coal and rock mass under coupling action of water, gas and temperature.

The disclosure provides a loading system for a Hopkinson pressure bar test under water-gas-temperature multi-field coupling action. The system includes a sample sealed cabin, a gas pressure loading device, a water pressure loading device, a temperature loading device, and a dynamic and static combined loading device for a Hopkinson pressure bar. The sample sealed cabin includes sealing flanges, Y-shaped and high-temperature resistant sealing rings and a sealed cabin body. The sealed cabin body is a cylindrical hollow cavity; a left wall and a right wall of the sealed cabin body are provided with circular openings having an inner diameter of 50 mm, respectively; inner walls of the circular openings are provided with grooves respectively, for installing the Y-shaped and high-temperature resistant sealing rings. The left wall and the right wall of the sealed cabin body are symmetrically provided with a gas inlet and a gas outlet respectively; where the gas inlet is also used as a water inlet and the gas outlet is also used as a water outlet. The sealed cabin body is connected with the sealing flanges through high-strength bolts, two ends of each sealing flange are vertically fixed on the sliding guide rails through U-shaped groove steel plates.

The gas pressure loading device includes a high-pressure gas tank, a pressure regulating valve, a second barometer, a second high-pressure valve and a first three-way valve connected in sequence; other two ends of the first three-way valve are connected with a second three-way valve arranged outside the gas inlet of the sample sealed cabin and a vacuum pumping device respectively. The vacuum pumping device includes a first high-pressure valve, a first barometer and a vacuum pump connected in sequence; components of the gas pressure loading device are connected by high-pressure resistance rubber gas tubes.

The water pressure loading device includes an electric pressure test water pump, a water pressure gauge, an accumulator and a one-way valve connected in sequence. The one-way valve is connected with the second three-way valve outside the sample sealed cabin; where all components of the water pressure loading device are connected by high-pressure resistance rubber water tubes; the electric pressure test water pump provides water pressure, the accumulator ensures stability of the water pressure, and the water pressure gauge monitors the water pressure.

The temperature loading device includes thermocouple heating rods, a temperature display and a thermocouple temperature control circuit board connected in sequence; where a heating temperature of each thermocouple heating rod is within a range of 0-100° C., and the thermocouple heating rods, the temperature display and the thermocouple control circuit board are electrically connected together.

The dynamic and static combined loading device for the Hopkinson pressure bar includes an axial pressure loading device, an impact loading device and a Hopkinson pressure bar member. The axial pressure loading device includes a transmission rod and an axial hydraulic cylinder, where static prestress load is applied to the transmission rod and a sample through an oil pressure in the axial hydraulic cylinder. The impact loading device includes a high-pressure gas storage chamber, a bullet, a gun barrel and an incident rod, where the high-pressure gas storage chamber stores high-pressure gas as an impact power source, the circular gun barrel is embedded in a gas outlet of the high-pressure gas chamber, the bullet is placed in the gun barrel, and the high-pressure gas is released to drive the bullet to complete impact loading. The Hopkinson pressure bar member includes an impact limiting device and an axial pressure limiting device; the impact limiting device includes a first limiting flange, a cylindrical limiting cylinder, sliding guide rails and a second limiting flange. A hollow cavity with a diameter equal to that of the incident rod is formed within the cylindrical limiting cylinder, and the cylindrical limiting cylinder is connected with the first limiting flange and the second limiting flange through high strength bolts. Two ends of each limiting flange are vertically fixed on the sliding guide rails through U-shaped groove steel plates. An end of the incident rod passes through the cylindrical limiting cylinder to limit movement of the incident rod only along an axial direction, an other end of the incident rod is connected with the sample sealed cabin through a first fixing support, and an other end of the sample sealed cabin is connected with the axial pressure limiting device through the transmission rod. The axial pressure limiting device includes a first axial pressure limiting flange, a second axial pressure limiting flange, a fixing rod, a buffer tailstock, a buffer tailstock fixing groove, and sliding guide rails. The sliding guide rails slide only along the axial direction, the axial pressure limiting device limits the transmission rod and the axial hydraulic cylinder to load only along the axial direction, an end of the axial hydraulic cylinder is provided with the buffer tailstock, which is located on the buffer tailstock fixing groove.

Further, the gun barrel is fixed through a second fixing support, which includes a vertical plate and a base perpendicular to the vertical plate, a through hole is provided in a center of the larger side of the vertical plate, and the gun barrel passes through the through hole.

Further, the sample sealed cabin and the axial pressure limiting device are placed on the sliding guide rails.

Further, a half of each thermocouple heating rod is embedded in the sample sealed cabin.

Further, the vacuum pumping device includes a first high-pressure valve, a first barometer and a vacuum pump connected in sequence; the water pressure loading device includes an electric pressure test water pump, a water pressure gauge, an accumulator and a one-way valve connected in sequence; and the temperature loading device includes thermocouple heating rods, a temperature display and a thermocouple control circuit board connected in sequence.

The present disclosure provides a loading method for a Hopkinson pressure bar test under water-gas-temperature multi-field coupling action, including the following steps:

drilling step, configured for drilling a large coal sample to obtain a core according to rock dynamics test standards, cutting and polishing the core to make a cylindrical sample with a height-diameter ratio of 0.6, clamping the cylindrical sample between the incident rod and the transmission rod, moving the sealed cabin body through the sliding guide rails to place the cylindrical sample into the sample sealed cabin;

applying step, configured for activating the axial pressure loading device of the dynamic and static combined loading device for the Hopkinson pressure bar, and applying static prestress load to the cylindrical sample to a predetermined value, by the axial hydraulic cylinder and the transmission rod;

vacuum degassing step, configured for activating the vacuum pumping device, performing vacuum degassing on the sample sealed cabin through the vacuum pump for 1 hour, and deactivating the vacuum pump and closing the first high-pressure valve after the vacuum degassing is completed; where before the vacuum degassing step, the first high-pressure valve is in an open state, and the second high-pressure valve and the one-way valve are in a closed state;

filling gas step, configured for opening the second high-pressure valve and the pressure regulating valve of the gas pressure loading device to fill gas in the sample sealed cabin; closing the pressure regulating valve and the second high-pressure valve in sequence when a reading of the second barometer reaches a predetermined value;

filling water step, configured for opening the one-way valve and activating the electric pressure test water pump to fill water in the sample sealed cabin, and deactivating the electric pressure test water pump and closing the one-way valve when a water pressure reaches a predetermined value; where after filling water step is completed, the gas in the sample sealed cabin is further compressed by the water filled; after reaching equilibrium, the water and the gas in the sample sealed cabin are in direct contact with the cylindrical sample, and pressures acting on the cylindrical sample by the water and the gas are equal;

heating step, configured for turning on a heating switch in the thermocouple control circuit board, first heating the sealed cabin body through the thermocouple heating rods, wherein the sealed cabin body heated further heats the cylindrical sample through the water therein via heat conduction; turning off the heating switch when a value displayed by the temperature display reaches a predetermined value, where the sample prestressed is under condition of water-gas-temperature multi-field coupling; and obtaining data step, configured for activating the impact loading device to apply a dynamic impact load on the sample under the condition of water-gas-temperature multi-field coupling, and obtaining impact experimental data.

The present disclosure has the following beneficial effects.

The present disclosure can apply water pressure and gas pressure to the test sample in situ and heat it in real time, and carry out experimental research on dynamic and static combined loading test based on Hopkinson pressure bar under coupling action of different water pressure, gas pressure and temperature field. The disclosure solves the technical difficulty that the water-gas-temperature multi-field coupling test cannot be carried out in dynamic impact loading of coal and rock materials, especially in the dynamic and static combined loading of Hopkinson pressure bar.

Figure 1:
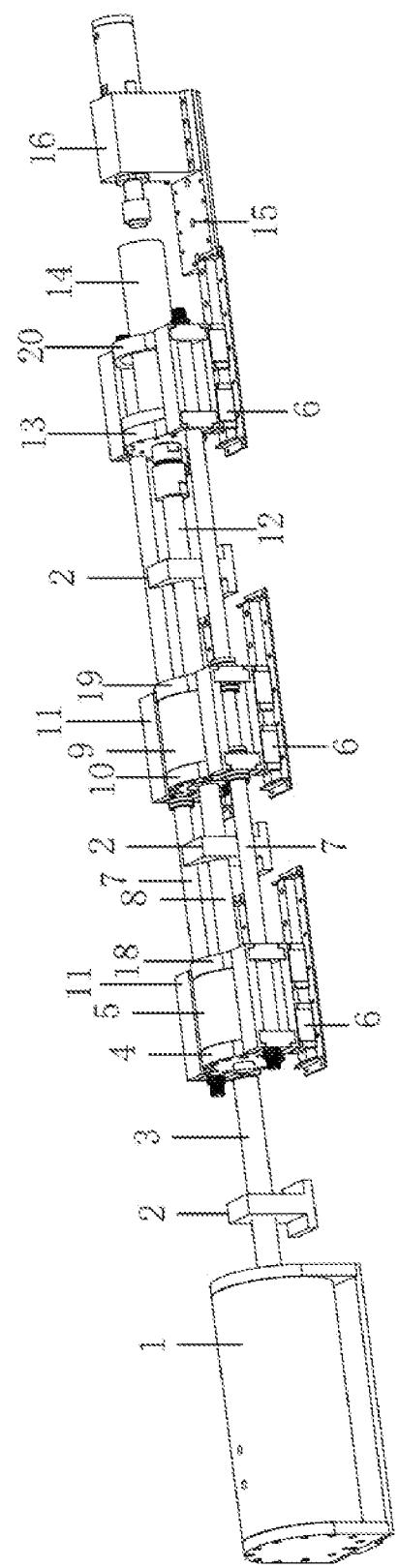
FIG. 1 is a schematic diagram of a three-dimensional structure of a loading system for a Hopkinson pressure bar test under water-gas-temperature multi-field coupling action.

List of reference numerals: 1 high-pressure gas storage chamber, 2 fixing support, 3 gun barrel, 4 first limiting flange, 5 cylindrical limiting cylinder, 6 sliding guide rail, 7 fixing rod, 8 incident rod, 9 sample sealed cabin, 10 first sealing flange, 11 U-shaped groove steel plate, 12 transmission rod, 13 first axial pressure limiting flange, 14 axial hydraulic cylinder, 15 buffer tailstock fixing groove, 16 buffer tailstock, 17 bullet, 18 second limiting flange, 19 second sealing flange, 20 second axial pressure limiting flange, 21 Y-shaped and high-temperature resistant sealing ring, 22 limit clamping groove, 23 high-strength bolt, 24 fixing rod sleeve, 25 thermocouple heating rod, 26 water (gas) inlet, 27 water (gas) outlet, 28 sample, 29 first three-way valve, 30 first high-pressure valve, 31 first barometer, 32 vacuum pump, 33 second high-pressure valve, 34 second barometer, 35 pressure regulating valve, 36 gas tank, 37 second three-way valve, 38 one-way valve, 39 accumulator, 40 water pressure gauge, 41 electric pressure test water pump, 42 thermocouple control circuit board, 43 temperature display, 44 third high-pressure valve, 45 sealed cabin body.

DETAILED DESCRIPTION OF THE EMBODIMENTS

The disclosure will be further described below through the embodiments, but is not limited to the following embodiments.

Embodiment 1

Figure 2:
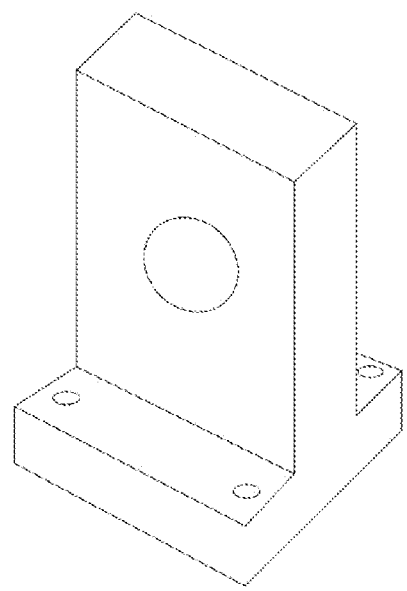
FIG. 2 is a perspective view of a fixing support.
Figure 3:
FIG. 3 is a perspective view of a bullet.
Figure 4:
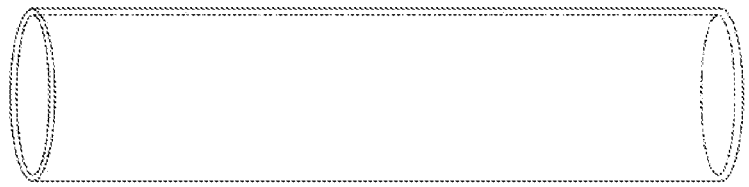
FIG. 4 is a perspective view of a gun barrel.
Figure 5:
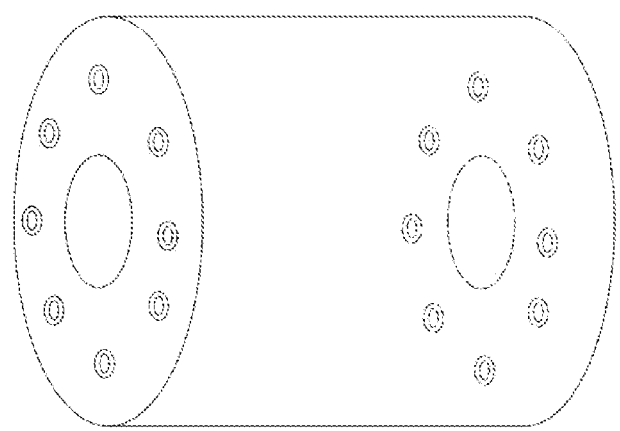
FIG. 5 is a perspective view of a cylindrical limiting cylinder.
Figure 6:
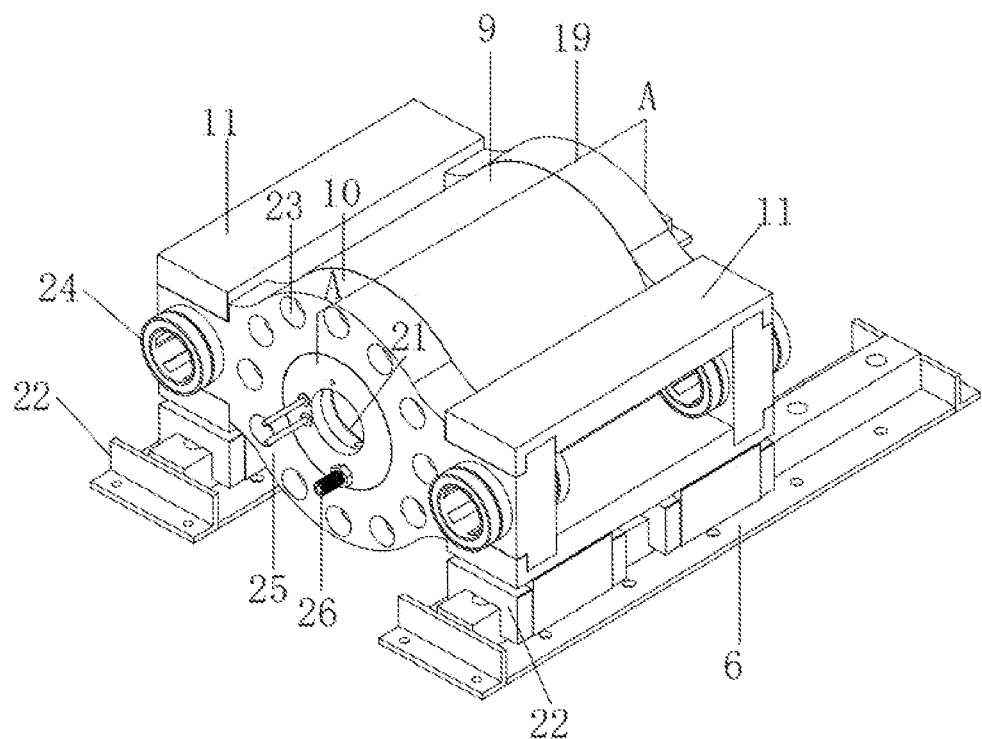
FIG. 6 is a perspective view of a sample sealed cabin according to the present disclosure.
Figure 7:
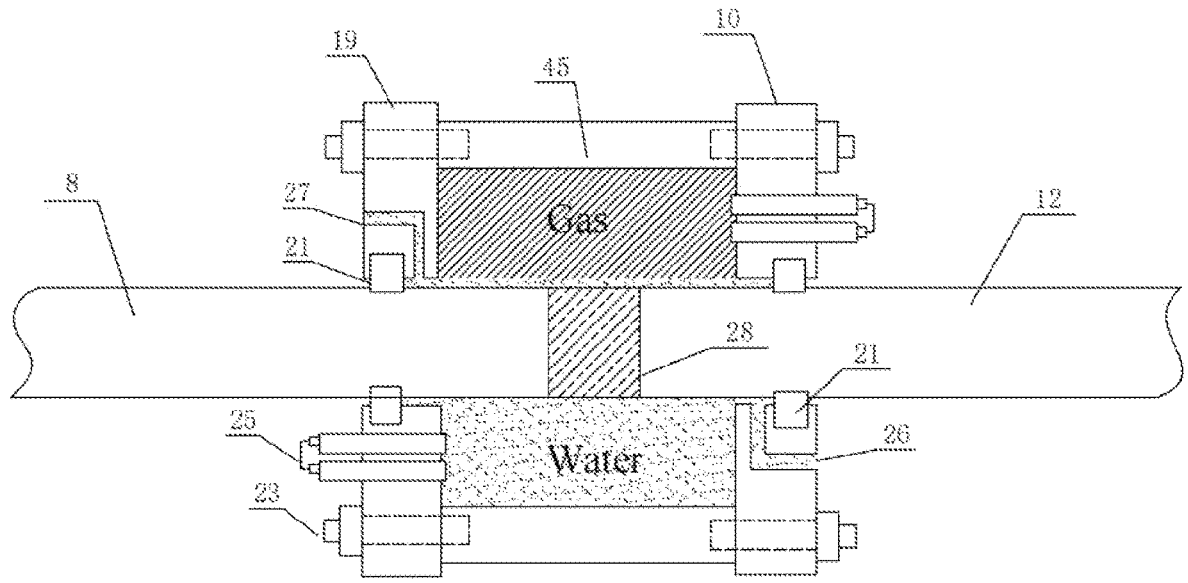
FIG. 7 is a sectional view along line A-A in FIG. 6.
Figure 8:
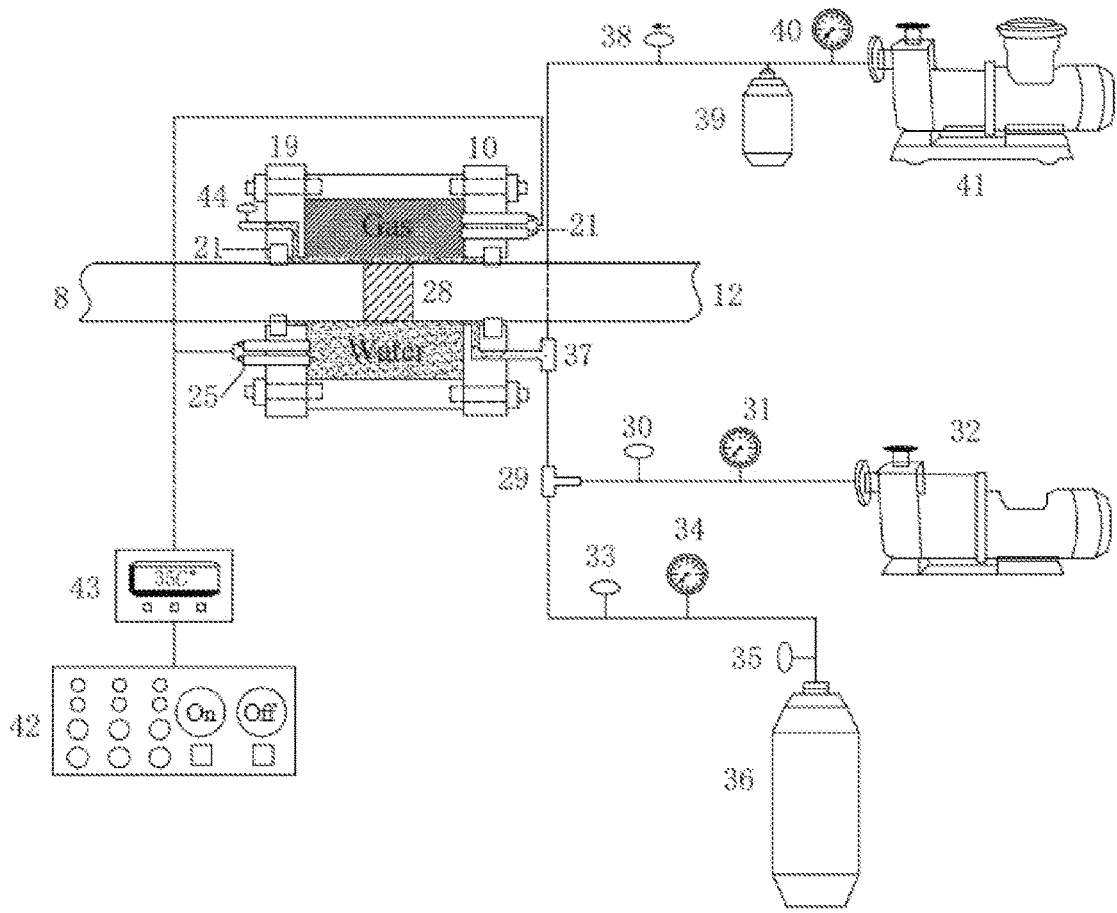
FIG. 8 is a schematic diagram of the loading system under water-gas-temperature multi-field coupling action, according to the present disclosure.

As shown in FIGS. 1-8, a loading system for a Hopkinson pressure bar test under water-gas-temperature multi-field coupling action includes a sample sealed cabin, a gas pressure loading device, a water pressure loading device, a temperature loading device, and a dynamic and static combined loading device for a Hopkinson pressure bar.

The sample sealed cabin includes a sealing flange, a Y-shaped and high-temperature resistant sealing ring 21 and a sealed cabin body 45. The sealed cabin body is formed with a cylindrical hollow cavity. Each of a left side and a right side of the sealed cabin body is provided with a circular opening with an inner diameter of 50 mm, an inner wall of the circular opening is provided with a groove for installing the Y-shaped and high-temperature resistant sealing ring 21, and outer walls of the circular openings are symmetrically provided with a gas inlet and a gas outlet respectively, in which the gas inlet is also a water inlet and the gas outlet is also a water outlet. The sealed cabin body 45 is connected with a first sealing flange 10 and a second sealing flange 19 through high-strength bolts 23, and both ends of the sealing flange are vertically fixed on the sliding guide rails 6 through U-shaped groove steel plates 11.

The gas pressure loading device includes a high-pressure gas tank 36, a pressure regulating valve 35, a second barometer 34, a second high-pressure valve 33 and a first three-way valve 29 connected in sequence. The other two ends of the first three-way valve 29 are connected with a second three-way valve 37 arranged outside the gas inlet 26 of the sample sealed cabin 9 and the vacuum pumping device respectively. The vacuum pumping device includes a first high-pressure valve 30, a first barometer 31 and a vacuum pump 32 connected in sequence. Components of the gas pressure loading device are connected by high-pressure resistance rubber gas tubes.

The water pressure loading device includes an electric pressure test water pump 41, a water pressure gauge 40, an accumulator 39 and a one-way valve 38 connected in sequence. The one-way valve 38 is connected with the second three-way valve 37 outside the sample sealed cabin. All components of the water pressure loading device are connected by high-pressure resistance rubber water tubes. The electric pressure test water pump 41 provides water pressure, and the accumulator 39 ensures the stability of water pressure, and the water pressure gauge 40 monitors the water pressure.

The temperature loading device includes thermocouple heating rods 25, a temperature display 43 and a thermocouple temperature control circuit board 42 connected in sequence. A heating temperature of each thermocouple heating rod 25 is within a range of 0-100° C. The thermocouple heating rods 25, the temperature display 43 and the thermocouple control circuit board 42 are electrically connected, together.

The Hopkinson pressure bar dynamic and static combined loading device includes an axial pressure loading device, an impact loading device and a Hopkinson pressure bar member. The axial pressure loading device includes a transmission rod 12 and an axial hydraulic cylinder 14; the static prestress load can be applied to the transmission rod 12 and the sample through the oil pressure in the axial hydraulic cylinder 14. The impact loading device includes a high-pressure gas storage chamber 1, a bullet 17, a gun barrel 3 and an incident rod 8; the high-pressure gas storage chamber 1 stores high-pressure gas as the impact power source, the circular gun barrel is embedded in the gas outlet of the high-pressure gas storage chamber 1, the bullet 17 is placed in the gun barrel 3, and the high-pressure gas can be released to drive the bullet 17 to complete impact loading. The Hopkinson pressure bar member includes an impact limiting device and an axial pressure limiting device. The impact limiting device includes a first limiting flange 4, a cylindrical limiting cylinder 5, sliding guide rails 6 and a second limiting flange 18. A hollow cavity with the same diameter as that of the incident rod 8 is formed inside the cylindrical limiting cylinder 5, and a cylinder body of the cylindrical limiting cylinder 5 is connected with the first and second limiting flanges through high-strength bolts 23. Both ends of the first and second limiting flanges are vertically fixed on the sliding guide rails through the U-shaped groove steel plates 11, and one end of the incident rod 8 passes through the cylindrical limiting cylinder 5 to limit the movement of the incident rod 8 only along the axial direction. The other end of the incident rod 8 is connected with the sample sealed cabin 9 through the fixing support 2, and the other end of the sample sealed cabin 9 is connected with the axial pressure limiting device. The sample sealed cabin 9 includes sealing flanges, Y-shaped and high-temperature resistant sealing rings 21 and a sealed cabin body 45. The axial pressure limiting device includes the first axial pressure limiting flange 13, the second axial pressure limiting flange 20, the fixing rod 7, the buffer tailstock 16, the buffer tailstock fixing groove 15, and the sliding guide rails 6. The sliding guide rail can slide only along the axial direction, and the axial pressure limiting device limits the transmission rod 12 and the axial hydraulic cylinder 14 to load only along the axial direction. An end of the axial hydraulic cylinder 14 is provided with the buffer tailstock 16, which is located on the buffer tailstock fixing groove 15.

Further, the gun barrel 3 is fixed through a fixing support 2, which includes a vertical plate and a base perpendicular to the vertical plate. A through hole is provided in a center of the vertical plate, and the gun barrel 3 passes through the through hole.

Further, the sample sealed cabin 9 and the axial pressure limiting device are placed on the sliding guide rail 6.

Further, a half of each thermocouple heating rod 25 is embedded in the sample sealed cabin 9.

Further, the vacuum pumping device includes a first high-pressure valve 30, a first barometer 31 and a vacuum pump 32 connected in sequence. The water pressure loading device includes an electric pressure test water pump 41, a water pressure gauge 40, an accumulator 39 and a one-way valve 38 connected sequentially. The temperature loading device includes thermocouple heating rods 25, a temperature display 43 and a thermocouple control circuit board 42 connected in sequence.

The disclosure provides a method for using the loading system, including the following steps:
- step 1, drilling a large coal sample to get a core, cutting and polishing the core to make a cylindrical sample with a height-diameter ratio of 0.6, clamping the cylindrical sample between the incident rod 8 and the transmission rod 12, moving the sealed cabin body 45 through the sliding guide rails 6 to place the cylindrical sample into the sample sealed cabin 9;
- step 2, activating the axial pressure loading device of the dynamic and static combined loading device for the Hopkinson pressure bar, and applying static prestress load to the cylindrical sample to a predetermined value, through the axial hydraulic cylinder 14 and the transmission rod 12;
- step 3, activating the vacuum pumping device, performing vacuum degassing on the sample sealed cabin 9 through the vacuum pump 32 for 1 hour, and deactivating the vacuum pump 32 and closing the first high-pressure valve 30 after the vacuum degassing is completed;
- before the step 3, the first high-pressure valve 30 is in an open state, and the second high-pressure valve 33 and the one-way valve 38 are in a closed state.
- step 4, opening the second high-pressure valve 33 and the pressure regulating valve 35 of the gas pressure loading device to fill the gas in the sample sealed cabin 9; closing the pressure regulating valve 35 and the second high-pressure valve 33 in sequence when a reading of the second pressure gauge 34 reaches a predetermined value;
- step 5, opening the one-way valve 38 and activating the electric pressure test water pump 41 to fill water in the sample sealed cabin 9, and deactivating the electric pressure test water pump 41 and closing the one-way valve 38 when the water pressure reaches a predetermined value;
- where after step 5 is completed, the gas in the sample sealed cabin 9 can be further compressed by the water filled; after reaching equilibrium, the water and the gas in the sample sealed cabin 9 may be in direct contact with the cylindrical sample, and pressures acting on the cylindrical sample by the water and the gas are the same;
- 6) turning on the heating switch in the thermocouple control circuit board 42, first heating the sealed cabin body 45 through the thermocouple heating rod 25, where the heated sealed cabin body 45 can further heat the cylindrical sample through the water therein via heat conduction; turning off the thermocouple switch when a value displayed by the temperature display 43 reaches a predetermined value, where the prestressed sample is under condition of water-gas-temperature multi-field coupling;
- 7) activating the impact loading device to apply a dynamic impact load on the sample under the condition of water-gas-temperature multi-field coupling, and obtaining impact experimental data.

The above embodiments are preferred embodiments of the present disclosure, and not aimed to limit application range of the present disclosure. Any person of ordinary skills in the art can make some improvements without departing from the scope of the disclosure, that is, all equivalent improvements made according to the disclosure shall be covered by the scope of the disclosure.

What is claimed is:

1. A loading system for a Hopkinson pressure bar test under water-gas-temperature multi-field coupling action, comprising a sample sealed cabin, a gas pressure loading device, a water pressure loading device, a temperature loading device, and a dynamic and static combined loading device for a Hopkinson pressure bar; wherein the sample sealed cabin comprises sealing flanges, Y-shaped and high-temperature resistant sealing rings and a sealed cabin body; the sealed cabin body is formed with a cylindrical hollow cavity; a left wall and a right wall of the sealed cabin body are symmetrically provided with a gas inlet and a gas outlet respectively; the gas inlet is also used as a water inlet and the gas outlet is also used as a water outlet; the sealed cabin body is connected with the sealing flanges through high-strength bolts, two ends of each sealing flange are vertically fixed on the sliding guide rails through U-shaped groove steel plates;

the gas pressure loading device comprises a high-pressure gas tank, a pressure regulating valve, a second barometer, a second high-pressure valve and a first three-way valve connected in sequence; other two ends of the first three-way valve are connected with a second three-way valve arranged outside the gas inlet of the sample sealed cabin and a vacuum pumping device respectively; the vacuum pumping device comprises a first high-pressure valve, a first barometer and a vacuum pump connected in sequence; components of the gas pressure loading device are connected by high-pressure resistant rubber gas tubes;

the water pressure loading device comprises an electric pressure test water pump, a water pressure gauge, an accumulator and a one-way valve connected in sequence; the one-way valve is connected with the second three-way valve outside the sample sealed cabin; wherein all components of the water pressure loading device are connected by high-pressure resistant rubber water tubes; the electric pressure test water pump provides water pressure, the accumulator ensures stability of the water pressure, and the water pressure gauge monitors the water pressure;

the temperature loading device comprises thermocouple heating rods, a temperature display and a thermocouple temperature control circuit board connected in sequence; the thermocouple heating rods, the temperature display and the thermocouple control circuit board are electrically connected;

the dynamic and static combined loading device for the Hopkinson pressure bar comprises an axial pressure loading device, an impact loading device and a Hopkinson pressure bar member; the axial pressure loading device comprises a transmission rod and an axial hydraulic cylinder, wherein a static prestress load is applied to the transmission rod and a sample through an oil pressure in the axial hydraulic cylinder; the impact loading device comprises a high-pressure gas storage chamber, a bullet, a gun barrel and an incident rod, wherein the high-pressure gas storage chamber stores high-pressure gas as an impact power source, the gun barrel is embedded in a gas outlet of the high-pressure gas storage chamber, the bullet is placed in the gun barrel, and the high-pressure gas is released to drive the bullet to implement impact loading; the Hopkinson pressure bar member comprises an impact limiting device and an axial pressure limiting device; the impact limiting device comprises a first limiting flange, a cylindrical limiting cylinder, sliding guide rails and a second limiting flange, wherein an end of the incident rod passes through the cylindrical limiting cylinder to limit movement of the incident rod only along an axial direction, an other end of the incident rod is connected with the sample sealed cabin through a first fixing support, and an other end of the sample sealed cabin is connected with the axial pressure limiting device through the incident rod; the axial pressure limiting device comprises a first axial pressure limiting flange, a second axial pressure limiting flange, a fixing rod, a buffer tailstock, a buffer tailstock fixing groove, and sliding guide rails, wherein the sliding guide rails slide only along the axial direction, the axial pressure limiting device limits the transmission rod and the axial hydraulic cylinder to load only along the axial direction, an end of the axial hydraulic cylinder is provided with the buffer tailstock, which is located on the buffer tailstock fixing groove.

2. The loading system according to claim 1, wherein a hollow cavity with a diameter equal to that of the incident rod is formed within the cylindrical limiting cylinder, a cylinder body of the cylindrical limiting cylinder is connected with the first limiting flange and the second limiting flange through high strength bolts, two ends of each limiting flange are vertically fixed on the sliding guide rails through U-shaped groove steel plates.

3. The loading system according to claim 1, wherein the gun barrel is fixed through a second fixing support, which comprises a vertical plate and a base perpendicular to the vertical plate, a through hole is provided in a center of the vertical plate, and the gun barrel passes through the through hole.

4. The loading system according to claim 1, wherein the sample sealed cabin and the axial pressure limiting device are placed on the sliding guide rails.

5. The loading system according to claim 1, wherein a left wall and a right wall of the sealed cabin body of the sample sealed cabin are provided with circular openings having an inner diameter of 50 mm, respectively; inner walls of the circular openings are provided with grooves respectively, for installing the Y-shaped and high-temperature resistant sealing rings.

6. The loading system according to claim 1, wherein a half of each thermocouple heating rod in a lengthwise direction is embedded in the sample sealed cabin, a heating temperature of the thermocouple heating rod is within a range of 0-100° C.

7. A loading method for a Hopkinson pressure bar test under water-gas-temperature multi-field coupling action, using the loading system according to claim 1, comprising following steps:

drilling step, configured for drilling a large coal sample to obtain a core according to a rock dynamics test standard, cutting and polishing the core to obtain a cylindrical sample with a height-diameter ratio of 0.6, clamping the cylindrical sample between the incident rod and the transmission rod, moving the sealed cabin body through the sliding guide rails to place the cylindrical sample into the sample sealed cabin;

applying step, configured for activating the axial pressure loading device of the dynamic and static combined loading device for the Hopkinson pressure bar, to apply static prestress load to the cylindrical sample to a predetermined value, by the axial hydraulic cylinder and the transmission rod;

vacuum degassing step, configured for activating the vacuum pumping device, to perform vacuum degassing on the sample sealed cabin through the vacuum pump for 1 hour, and deactivating the vacuum pump and closing the first high-pressure valve after the vacuum degassing is completed; wherein before the vacuum degassing step, the first high-pressure valve is in an open state, and the second high-pressure valve and the one-way valve are in a closed state;

filling gas step, configured for opening the second high-pressure valve and the pressure regulating valve of the gas pressure loading device to fill gas into the sample sealed cabin; closing the pressure regulating valve and the second high-pressure valve in sequence when a reading of the second barometer reaches a predetermined value;

filling water step, configured for opening the one-way valve and activating the electric pressure test water pump to fill water into the sample sealed cabin, and deactivating the electric pressure test water pump and closing the one-way valve when a water pressure reaches a predetermined value; wherein after the filling water step is completed, the gas in the sample sealed cabin is further compressed by the water filled; after reaching equilibrium, the water and the gas in the sample sealed cabin are in direct contact with the cylindrical sample, and pressures acting on the cylindrical sample by the water and the gas are equal;

heating step, configured for turning on a heating switch in the thermocouple control circuit board, first heating the sealed cabin body through the thermocouple heating rods, wherein the sealed cabin body heated further heats the cylindrical sample through the water therein via heat conduction; turning off the heating switch when a value displayed by the temperature display reaches a predetermined value, wherein the cylindrical sample prestressed is under the water-gas-temperature multi-field coupling action; and obtaining data step, configured for activating the impact loading device, for driving the bullet through the high-pressure gas to apply a dynamic impact load on the cylindrical sample under the water-gas-temperature multi-field coupling action, and obtaining impact experimental data.

8. The loading method according to claim 7, wherein a hollow cavity with a diameter equal to that of the incident rod is formed within the cylindrical limiting cylinder, a cylinder body of the cylindrical limiting cylinder is connected with the first limiting flange and the second limiting flange through high strength bolts, two ends of each limiting flange are vertically fixed on the sliding guide rails through U-shaped groove steel plates.

9. The loading method according to claim 7, wherein the gun barrel is fixed through a second fixing support, which comprises a vertical plate and a base perpendicular to the vertical plate, a through hole is provided in a center of the vertical plate, and the gun barrel passes through the through hole.

10. The loading method according to claim 7, wherein the sample sealed cabin and the axial pressure limiting device are placed on the sliding guide rails.

11. The loading method according to claim 7, wherein a left wall and a right wall of the sealed cabin body of the sample sealed cabin are provided with circular openings having an inner diameter of 50 mm, respectively; inner walls of the circular openings are provided with grooves respectively, for installing the Y-shaped and high-temperature resistant sealing rings.

12. The loading method according to claim 7, wherein a half of each thermocouple heating rod in a lengthwise direction is embedded in the sample sealed cabin, a heating temperature of the thermocouple heating rod is within a range of 0-100° C.

\* \* \* \* \*